(12) United States Patent
Naydenov et al.

(10) Patent No.: US 12,149,192 B2
(45) Date of Patent: Nov. 19, 2024

(54) METHOD AND DEVICE FOR RESTORATION OF A BATTERY'S ENERGY PARAMETERS

(71) Applicants: Vesselin Bojidarov Naydenov, Sofia (BG); Yordan Yordanov Nachev, Sofia (BG); Boris Ivanov Monahov, Apex, NC (US); Dag A. Valand, Wachtberg (DE)

(72) Inventors: Vesselin Bojidarov Naydenov, Sofia (BG); Yordan Yordanov Nachev, Sofia (BG); Boris Ivanov Monahov, Apex, NC (US); Dag A. Valand, Wachtberg (DE)

(73) Assignee: WAVETECH GMBH, Rheinbach (DE)

( * ) Notice: Subject to any disclaimer, the term of this patent is extended or adjusted under 35 U.S.C. 154(b) by 251 days.

(21) Appl. No.: 17/688,308

(22) Filed: Mar. 7, 2022

(65) Prior Publication Data

US 2023/0283217 A1    Sep. 7, 2023

(51) Int. Cl.
*H01M 10/04* (2006.01)
*H02K 11/33* (2016.01)
*H02P 27/06* (2006.01)

(52) U.S. Cl.
CPC .............. *H02P 27/06* (2013.01); *H02K 11/33* (2016.01)

(58) Field of Classification Search
CPC .... H02P 27/06; H02K 11/33; H01M 10/4207; H01M 10/4214; H01M 10/441; H01M 50/70
See application file for complete search history.

(56) References Cited

U.S. PATENT DOCUMENTS

| 2009/0015200 | A1  | 1/2009  | Wieger |
| 2012/0235473 | A1* | 9/2012  | Jiang ...................... B60L 58/20 307/9.1 |
| 2013/0065111 | A1* | 3/2013  | Kim ...................... H01M 50/70 118/500 |
| 2013/0221931 | A1  | 8/2013  | Aanensen |
| 2020/0333401 | A1  | 10/2020 | Miller |

OTHER PUBLICATIONS

International Search Report and Written Opinion for related International Application No. PCT/US2022/019284, dated Feb. 3, 2023, 21 pages.

\* cited by examiner

*Primary Examiner* — Muhammad S Islam
(74) *Attorney, Agent, or Firm* — Moore & Van Allen PLLC; Michael M. McCraw

(57) ABSTRACT

A device for restoring energy parameters of a battery is provided. The device includes a supporting frame, a controller, and a battery container configured to receive the battery therein, the battery container being operably coupled to a controlling inverter and a motor comprising a motor reductor. The controlling inverter is configured to regulate a rotational speed of the motor. The motor reductor is configured to facilitate rotation of the battery container. Methods of restoring energy parameters of a battery are also provided.

23 Claims, 6 Drawing Sheets

```
                                510

┌─────────────────────────────────┐
                    │ FIXING A BATTERY IN A BATTERY CONTAINER │
                    └─────────────────────────────────┘
                                511  │
                                     ▼
                    ┌─────────────────────────────────┐
                    │ WEIGHT BALANCIING THE BATTERY WHEN THE │
                    │ BATTERY IS FIXED IN THE BATTERY CONTAINER │
                    └─────────────────────────────────┘
                                512  │
                                     ▼
                    ┌─────────────────────────────────┐
                    │ CONNECTING THE BATTERY TO A BIPOLAR │
                    │ OVERVOLTAGE PULSER AND APPLYING │
                    │ ALTERNATING POSITIVE AND NEGATIVE PULSES │
                    │ TO THE BATTERY │
                    └─────────────────────────────────┘
                                520  │
                                     ▼
                    ┌─────────────────────────────────┐
                    │ ROTATING THE BATTERY FIXED IN THE BATTERY │
                    │ CONTAINER │
                    └─────────────────────────────────┘
                                521  │
                                     ▼
                    ┌─────────────────────────────────┐
                    │ ELECTRICALLY CONTACTING THE BATTERY AND A │
                    │ CHARGE DEVICE TO RESTORE ONE OR MORE │
                    │ ENERGY PARAMETERS OF THE BATTERY │
                    └─────────────────────────────────┘
                                530  │
                                     ▼
                    ┌─────────────────────────────────┐
                    │ HOMOGENIZIING AN ELECTROLYTE │
                    │ CONCENTRATION WITHIN INTERNAL │
                    │ COMPONENTS OF AT LEAST ONE CELL CONTAINED │
                    │ WITHIN THE BATTERY │
                    └─────────────────────────────────┘
```

FIG. 5

METHOD AND DEVICE FOR RESTORATION OF A BATTERY'S ENERGY PARAMETERS

FIELD

The presently-disclosed invention relates generally to the field of batteries and, more particularly, to devices and methods for restoring the energy parameters of batteries.

BACKGROUND

Lead-acid batteries are a commonly selected power source due to their availability, ability to be recharged, and favorable energy output to cost ratio. Many improvements have been made in the lead acid battery industries in recent years; however, despite these recent improvements and advantages, lead-acid batteries, and specifically valve regulated lead-acid batteries ("VRLA"), do have some disadvantages. One such disadvantage is that the electrochemical processes taking place in the cell can cause separation of the electrolyte contained within the cell. Homogeneity of the concentration of the acid in the electrolyte is one of the main thermodynamic requirements for effective and reversible performance of the electrochemical processes during operation and storage of the lead-acid batteries. Separation of the electrolyte in lead-acid batteries leads to a stratification of the sulfuric acid concentration within the cell. It has been firmly established that this side-effect occurs both during the operation of the lead-acid batteries and when they are stored for long periods of time, which adversely affects the energy parameters of the batteries.

Accordingly, there is a need for devices and methods that homogenize electrolyte concentration within the cell to restore energy parameters of lead-acid batteries.

BRIEF SUMMARY

One or more embodiments of the invention may address one or more of the aforementioned problems. Certain embodiments according to the invention provide methods and devices for homogenizing electrolyte concentration within a cell to restore energy parameters of a battery. In particular, according to a first aspect, a method for restoring the energy parameters of a battery is provided. The method comprises fixing the battery in a battery container, rotating the battery fixed in the battery container, and homogenizing an electrolyte concentration within internal components of at least one cell contained within the battery.

According to certain embodiments, the method may further comprise weight-balancing the battery when the battery is fixed in the battery container.

According to certain embodiments, the method may further comprise electrically contacting the battery and a programmable charging device to restore one or more energy parameters of the battery. Restoring the one or more energy parameters may occur simultaneously with rotating the battery fixed in the battery container.

According to certain embodiments, the method may further comprise connecting the battery to a bipolar overvoltage pulser and applying alternating positive and negative pulses to the battery.

According to certain embodiments, the battery may be in operation. In other embodiments, the battery may be inoperably stored.

According to certain embodiments, the battery may be a lead-acid battery. In some embodiments, the battery may be a valve-regulated battery. In certain embodiments, the battery may comprise a glass mat separator.

According to certain embodiments, rotating the battery may comprise rotating the battery around a center axis of rotation. In such embodiments, the battery may comprise a positive electrode on a first end, a negative electrode on a second end, and the center axis of rotation may correspond to a center of the battery with respect to the first and seconds ends.

In another aspect, a device for restoring energy parameters of a battery is provided. The device comprises a supporting frame, a controller, and a battery container configured to receive the battery therein, the battery container being operably coupled to a motor comprising a motor reductor and a controlling inverter. The controlling inverter is configured to regulate rotational speed of the motor, and the motor reductor is configured to facilitate rotation of the battery container. In some embodiments, the device may further comprise a programmable charging device and the controller may be configured to communicate with the programmable charging device. The controller may be configured to communicate with the controlling inverter. In several embodiments, the controller may be configured to calculate electrochemical recover parameters for the battery based on features of the battery. In some embodiments, the controller may operate via a wireless connection. In other embodiments, the controller may be contained within the programmable charging device.

According to certain embodiments, the device may further comprise a bipolar overvoltage battery pulser. The bipolar overvoltage battery pulser may be configured to connect to the battery and apply alternating positive and negative pulses to the battery.

According to certain embodiments, the device may further comprise a programmable charging device. The programmable charging device may be operably coupled to the battery.

According to certain embodiments, the device may further comprise a bearing axle having a central portion, and a slip ring mounted on the bearing axle.

According to certain embodiments, the battery may be a lead-acid battery. In some embodiments, the battery may be a valve-regulated battery. In certain embodiments, the battery may comprise a glass mat separator.

In yet another aspect, a non-transitory computer readable medium having computer readable program instructions stored therein is provided. The non-transitory computer readable medium comprises instructions which when performed by a controller are configured to cause the apparatus to at least perform, calculate electrochemical recovery parameters, and instruct a programmable charging device to deliver energy to the battery based upon the electrochemical recover parameters. In some embodiments, the instructions contained on the non-transitory computer readable medium which when performed by a controller are further configured to regulate energy provided to a controlling inverter to facilitate rotation of a battery so as to restore energy parameters of the battery by homogenizing an electrolyte concentration throughout at least one cell contained within the battery. Homogenizing the electrolyte concentration throughout the at least one cell contained within the battery comprises mechanically manipulating the electrolyte contained within internal components of the at least one cell until a sulfuric acid concentration is approximately uniform throughout the internal components of the at least one cell. In some embodiments, the non-transitory computer readable medium calculates the electrochemical recovery program based upon features of the battery.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a block diagram of a method of restoring the energy parameters of a battery.

DETAILED DESCRIPTION

Figure 1:
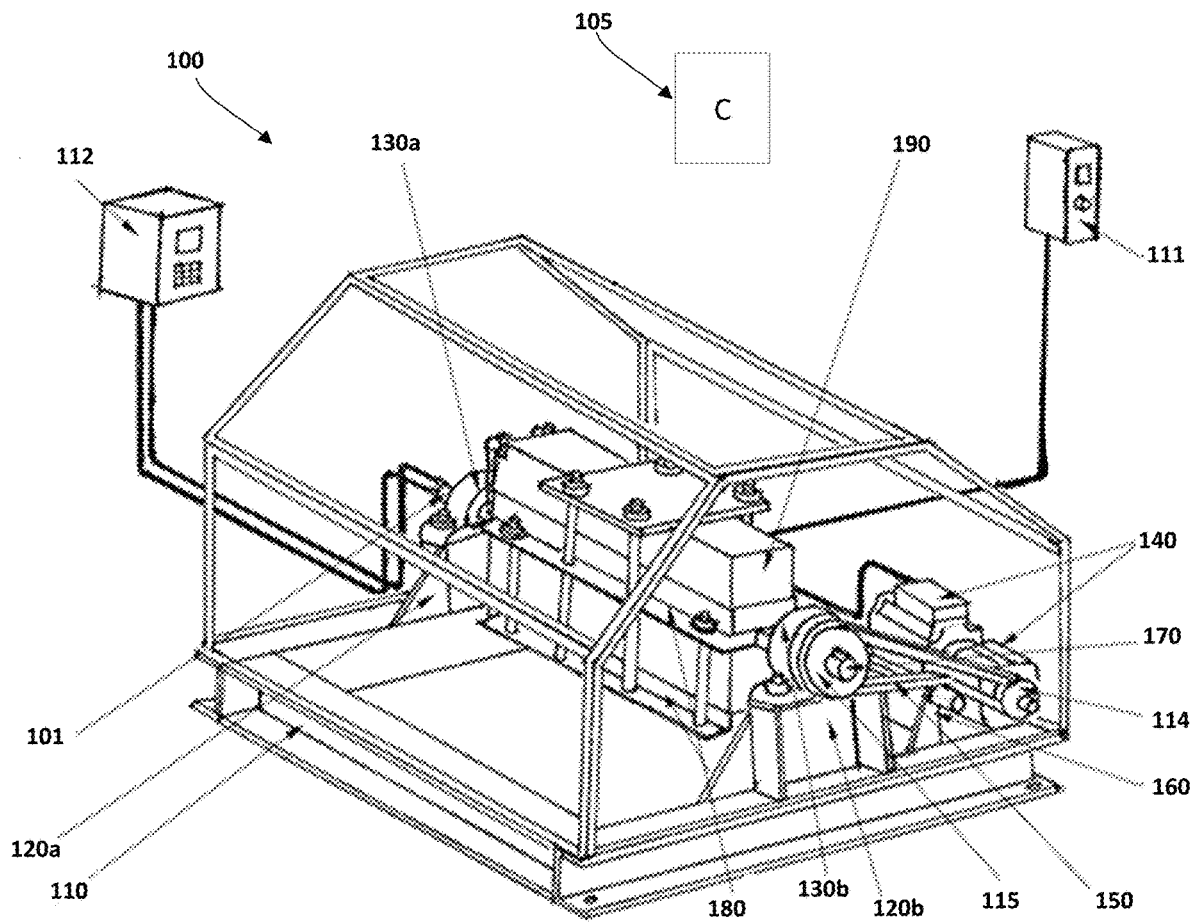
FIG. 1 illustrates a schematic view of a device for restoring energy parameters of a battery in accordance with certain embodiments of the invention.

The invention now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

In order for lead-acid batteries to maintain their energy parameters for prolonged periods, it is necessary for the sulfuric acid electrolyte solution to be homogeneous throughout the cell. Homogeneity of the acid in the electrolyte in lead-acid cells is a requirement for performance for all types of lead-acid batteries. However, this condition applies to the highest degree for the valve regulated lead-acid batteries, where the possibility for electrolyte homogenization is difficult.

In order to fully exemplify the necessity of electrolyte homogenization, for effective and reversive performance of the electrochemical processes during battery operation, the mechanisms by which the charge and discharge reactions of a lead-acid cells are discussed herein. The speed of the electrochemical reactions inside the lead-acid batteries depends on the electrode potential, the temperature, the concentrations of the electrolyte, the sulfuric acid solution, and the composition and additives in the active electrode masses. The chemical composition of the substances of the alloy of the conductive grids of the positive and negative electrodes is also a factor. These factors arise from the following electrochemical processes performed during battery operation:

Charging Reaction on the Positive Electrode:

$$PbSO_4+2H_2O \rightarrow PbO_2+2H^++H_2SO_4+2e^- \quad (1)$$

Charging Reactions on the Negative Electrode:

$$PbSO4+2H^++2e^- \rightarrow Pb+H_2SO_4 \quad (2)$$

$$Pb+\tfrac{1}{2}O_2+H_2SO_4 \rightarrow PbSO_4+H_2O+Q_{Heat} \quad (3)$$

In addition to these charging reactions taking place on the electrodes, the following chemical decomposition of the water takes place:

$$H_2O \rightarrow 2H^++\tfrac{1}{2}O_2+2e^- \quad (4)$$

Additional reaction by different mechanisms include:
Chemical Mechanism:

$$PbSO_4+2H^++2e^- \rightarrow Pb+H_2SO_4 \quad (5)$$

Electrochemical Mechanism:

$$\tfrac{1}{2}O_2+2H^+=2e^- \rightarrow H_2O \quad (6)$$

During discharge, the following electrochemical reactions take place on the positive electrode of the cell:

$$PbO_2+2H+H_2SO_4+2e^- \rightarrow PbSO_4+2H_2O \quad (7)$$

During discharge, the following electrochemical reactions take place on the negative electrode of the cell:

$$Pb+H_2SO_4 \rightarrow PbSO_4+2H^++2e^- \quad (8)$$

As indicated by the electrochemical reactions shown above, at the beginning, the water is consumed on the positive electrode and then begins the performance of the processes of water decomposition with separation of oxygen. At the same time during charge, water is being formed on the negative electrode. When the concentration of the separated oxygen has reached a threshold value, it begins to reduce on the negative electrode, where heat is produced.

In order to drive the reactions discussed above, an acceptable volume and concentration of sulfuric acid must be present throughout the cell. From reactions shown above, in order to maintain the thermodynamic equilibrium of the systems ration of $Pb/PbO_2$, it is necessary to keep the concentration of sulfuric acid in the volume of a cell within certain limits.

The voltage of the lead-acid cell in equilibrium is around 2V. This voltage value indicates that when the voltage value of the lead-acid cell is under 2V, the reactions that take place inside the cell leads to the formation of $Pb_2^+$ resulting in an imbalance and, ultimately, discharge. Alternatively, when the voltage value of the lead-acid cell becomes higher than 2V, the electrochemical reactions that take place in the cell lead to the formation of Pb and $PbO_2$, resulting in the opposite imbalance, but still ultimately causing discharge of the cell. While the mass values of the positive and negative electrodes inside the lead-acid cells are considered, the values of the equilibrium of the water should also be considered. Such values of potential equilibrium of the pair $H_2O/O_2$ is around 1.23V and for the pair $H_2/H_2O$ is 0V. These values indicate that oxidative reduction pairs are formed in the lead-acid element, being such process described in the Nernst equation as follows:

$$E_0=E_{0,standard}+RT/nF[(Ox/(Red)] \quad [\text{Eq. 1}]$$

The Nernst equation indicates that in the lead-acid element, in addition to the basic oxidative-reduction pairs of $Pb/Pb^{2+}$ and $Pb^{2+}/Pb^{4+}$, secondary oxidative-reduction pairs of $H_2O/O_2$ and $H_2/H_2O$ ($H_2/H_3O^+$ and $OH^-/O_2$) also participate in the reaction, because the electrolyte is an aqueous solution of sulfuric acid. This means that, for the full completion of the electrochemical process of charge and discharge in the lead-acid cells and batteries, it is necessary for the concentration of the electrolyte to be the same and available in all parts of the volume of the cells in the lead-acid batteries, respectively both in the volume of the separator and in the volumes of the positive and negative electrodes.

The requirement for electrolyte homogeneity applies to a considerable extent to the valve-regulated lead-acid batteries in widespread use today, which differ significantly in their construction from other types of lead-acid batteries. In many lead-acid cells, the electrolyte solution of the sulfuric acid is absorbed in the volume of the separator by the absorbing glass matt (AGM), which is a system of pores, formed by fine glass fibers. The AGM separator performs two functions, the first one is to separate the positive and negative electrodes, and the second one is to retain inside its volume the necessary amount of electrolyte in the cells of the lead-acid batteries. Precisely because of its specific construction, by using glass matt in this type of lead-acid battery, conditions are created for effective execution to water recombination of the oxygen and hydrogen gases that were released during charging. The possibility for the valve-regulated lead-acid batteries to work in the condition of closed oxygen cycle greatly reduces the loss of water during their charge, thus resulting in an extended operational period.

The mechanism of obtaining the stratification effect is also clearly presented, as a prolonged time period is needed for sulfuric acid to diffuse from the places with higher concentration to the places with lower concentration in the volume of the lead-acid batteries. As an example, when the lead-acid batteries are being charged, the concentration increases over time and a charge is formed in the porous volumes of the positive and negative electrodes due to sulfuric acid thereon. Because the electrolyte that is contained in this porous volume represents 20% of the total volume of the electrolyte inside the lead-acid batteries, it follows that the concentration of the electrolyte that is found in the pores of the electrodes becomes much higher than the concentration of the sulfuric acid in the whole volume of the electrolyte that is contained in the remainder of the internal components. In these cases, the concentration of the sulfuric acid in the pores of the electrodes has a higher concentration and it is considerably heavier than the acid in the volume of the separator and the free volume in the cells. When the sulfuric acid starts to leave the structural pores of the electrodes, it starts flowing towards the bottom of the cells, thus creating the effect of sludge or stratification of the solution of the sulfuric acid in the electrolyte, which has a detrimental effect on charging. This stratification of the electrolyte is the reason for obtaining lower voltage in the upper part of the electrodes where the electrolyte is more diluted, while in the lower part of the electrodes in the lead-acid cells the voltage has higher values due to increased electrolyte concentration.

Definitions

As used herein, the term "battery" may refer to all components comprising the battery including one or more cells, a container, and the like as understood by a person of ordinary skill in the art. The term "internal components of a cell" may refer to the components contained within the cell container. For example, in certain embodiments, internal components of a cell may include a positive electrode, a negative electrode, an electrolyte mixture, a separator, and the like, as understood by a person of ordinary skill in the art.

As used herein, the term "energy parameters" may refer to characteristics of batteries such as operating life, discharge capacity, charge acceptance, and the like, as understood by a person of ordinary skill in the art. Where reference is made to improving energy parameters, such improvement includes prolonging the exploitation life of the batteries, restoring discharging capacity to the as-manufactured defined levels, and restoring charge acceptance of the batteries, among other commercially preferred traits.

As used herein, the term "electrochemical recovery parameters" may refer to calculated or known parameters that can be used by the controller, controlling inverter, and/or the programmable charging device to optimize the restoration of energy parameters of a battery. Electrochemical recovery parameters may include but are not limited to the value of the current and the value of the voltage. Electrochemical recovery parameters may be calculated based upon features of a battery.

As used herein, the terms "homogenization", "homogenizing", and the like may refer to the process of establishing a homogenous concentration of sulfuric acid in the electrolyte contained throughout the internal components of a battery.

As used herein, the term "replaceable battery container" means a battery container that can be easily replaced when the need arises and mounted between the self-adjusting bearings mounted on the two oppositely mounted cantilevers of the supporting frame of the device described herein for homogenization.

As used herein, the term "customized battery container" means a battery container that has been manufactured according to the size of the batteries that will be subject to homogenization.

As used herein, the term "operably coupled" may refer to one or more components being electrically, mechanically, thermally, chemically, or otherwise linked to another component(s) in a manner that facilitates transmission of at least one signal between the components. For example, components may be part of the same structure and/or integral with one another (i.e. "directly coupled"). In other examples, components may be connected via remote means (e.g., via a signal transmitted to an electronic circuit).

As used herein, the terms "features of a battery" and "battery features" may be used interchangeably to refer to a battery's degree of charge, the type of battery, the size of the battery, they battery's energy capacity, the regime under which the battery was put to work, and the like, as understood by a person of ordinary skill in the art.

Device for Restoring Energy Parameters

The invention includes, according to certain embodiments, devices and methods for homogenizing electrolyte concentration within a cell to restore energy parameters of a battery. In particular, a device 100 is provided. The device 100 includes a controller 105 and a battery container 180 configured to receive a battery 190 therein. The battery container 180 is operably coupled to a controlling inverter 111 and a motor comprising a motor reductor 140. The controlling inverter 111 is configured to control rotational speed of the motor, and the motor reductor 140 is configured to facilitate rotation of the battery container 180.

Figure 2:
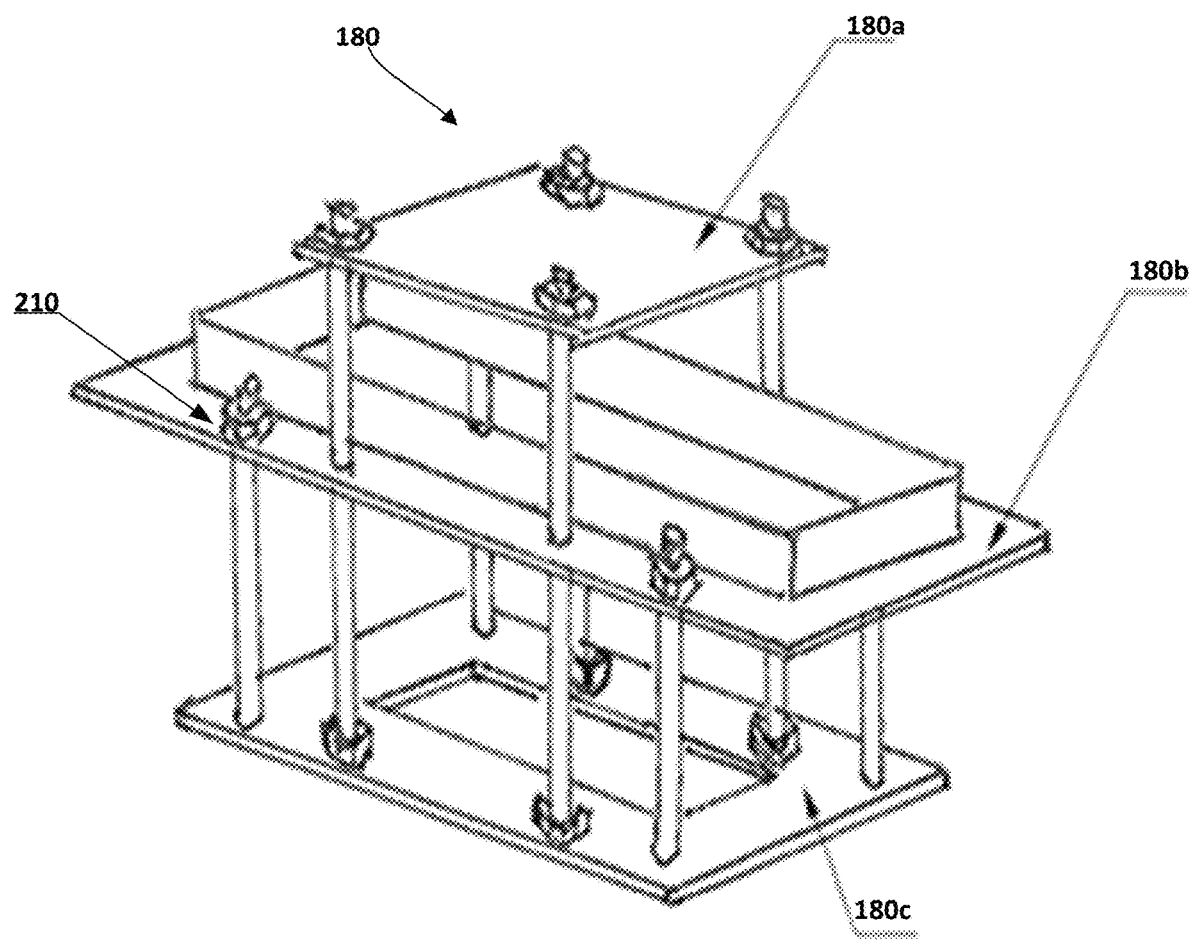
FIG. 2 illustrates the battery container in accordance with certain embodiments of the invention.

With reference to FIGS. 1-3, a device 100 is illustrated. As shown in FIG. 1, the device 100 includes a supporting frame 110 with the required size in accordance to the size of the batteries that will be subject of homogenization of the electrolyte contained therein. The drive belt 160 is fixed to the supporting frame 110 and the motor comprising a motor reductor 140 mounted thereon.

Two cantilevers 120a, 120b with self-adjusted bearings 130a, 130b are attached to the supporting frame 110, the self-adjusted bearings 130a, 130b having semi-axles 170 mounted in such a way that the centers of the bearings 130a, 130b are on a same horizontal axis line. In the semi-axles 170 between the bearings 130a, 130b, a battery container 180 is mounted, where the battery 190 is to be placed.

The battery container 180 is configured such that the battery 190 may optionally be weight balanced relative to the horizontal axis that goes through the centers of the bearings 130a, 130b. This axis further coincides with an imaginary axis which separates in height the electrodes in the lead-acid batteries in two parts, upper and lower. A flexible belt 150 between a drive pulley 114 and the pulley 115 mounted on the semi axle 170 of one of the opposite bearings 130a,130b is used to transmit energy from the motor reductor to the battery container, causing the battery container to rotate. Both power supply and control of the motor reductor 140 are performed by the programmable electronic controlling inverter 111. The device 100 may optionally be configured to connect the battery 190 with a programmable charging device 112 using a slip ring connector 101.

According to certain embodiments, the battery may be operably coupled with a bipolar overvoltage pulser (BEAT) device (not shown), as discussed, for example, in U.S. Pat. Nos. 8,436,587 and 8,716,982, which are hereby incorporated by reference. The BEAT device is configured to connect to the battery and apply alternating positive and negative pulses to the battery. Using the BEAT device with the device described herein may further improve the energy parameters of the battery.

In some embodiments the supporting frame is comprised of a carbon-based material. In some such embodiments, the supporting frame is comprised of profiled steel elements. In certain embodiments, the battery container is a customized battery container. In some embodiments, the battery container is a replaceable battery container. In some embodiments, the battery container is comprised of a metal material. In other embodiments, the battery container is comprised of polymer carbon materials.

According to certain embodiments, the battery may be a lead-acid battery. In some embodiments, the battery may be a valve-regulated battery. In certain embodiments, the battery may comprise a glass mat separator. In such embodiments, for example, homogenizing the electrolyte concentration within a cell may include homogenizing the electrolyte concentration within each of the positive and negative electrodes, the glass mat separator, and the remainder of the cell.

According to various embodiments, the device may be configured to accommodate batteries ranging in capacity from 1 Ah to 200 Ah. In some embodiments the battery may have a capacity of at least about 1.2 Ah. In some embodiments the battery may have a capacity of at least about 1.9 Ah. In some embodiments the battery may have a capacity of at least about 2.3 Ah. In some embodiments the battery may have a capacity of at least about 3 Ah. In some embodiments the battery may have a capacity of at least about 3.6 Ah. In some embodiments the battery may have a capacity of at least about 4 Ah. In some embodiments the battery may have a capacity of at least about 4.5 Ah. In some embodiments the battery may have a capacity of at least about 5 Ah. In some embodiments the battery may have a capacity of at least about 7 Ah. In some embodiments the battery may have a capacity of at least about 7.5 Ah. In some embodiments the battery may have a capacity of at least about 8 Ah. In some embodiments the battery may have a capacity of at least about 10 Ah. In some embodiments the battery may have a capacity of at least about 12 Ah. In some embodiments the battery may have a capacity of at least about 13 Ah. In some embodiments the battery may have a capacity of at least about 15 Ah. In some embodiments the battery may have a capacity of at least about 17 Ah. In some embodiments the battery may have a capacity of at least about 24 Ah. In some embodiments the battery may have a capacity of at least about 26 Ah. In some embodiments the battery may have a capacity of at least about 28 Ah. In some embodiments the battery may have a capacity of at least about 40 Ah. In some embodiments the battery may have a capacity of at least about 60 Ah. In some embodiments the battery may have a capacity of at least about 100 Ah. In some embodiments the battery may have a capacity of at least about 180 Ah. In some embodiments the battery may have a capacity of about 200 Ah or less. For example, in certain embodiments, the battery may have a capacity of at least about any of the following: 1, 2, 3, 4, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 196, 197, 198, and 199 Ah and/or at most about 200, 199, 198, 197, 196, 195, 190, 185, 180, 175, 170, 165, 160, 155, 150, 145, 140, 135, 130, 125, 120, 115, 110, 105, 100, 95, 90, 85, 80, 75, 70, 65, 60, 55, 50, 45, 40, 35, 30, 25, 20, 15, 10, 5, 4, 3, and 2 Ah (e.g., about 2-200 Ah, about 25-150 Ah, etc.).

FIG. 2 illustrates an example embodiment of the battery container 180 configured to receive a battery 190 therein. The battery container 180 is comprised of three parts: a top 180a, a middle 180b, and a bottom 180c, the three parts being interconnected by studs 210. In any or all of the parts, the outer perimeter of said parts may define an opening that is configured to receive a battery therein. The step of weight balancing the battery is carried out by adjusting the studs 210 when the battery is placed in the battery container 180. In some embodiments, the battery container may comprise more than three parts. In other embodiments, the battery container may comprise three parts. In still other embodiments, the battery container may comprise less than three parts. In some embodiments, the battery container may comprise a single part configured to receive a battery therein.

Figure 3A:
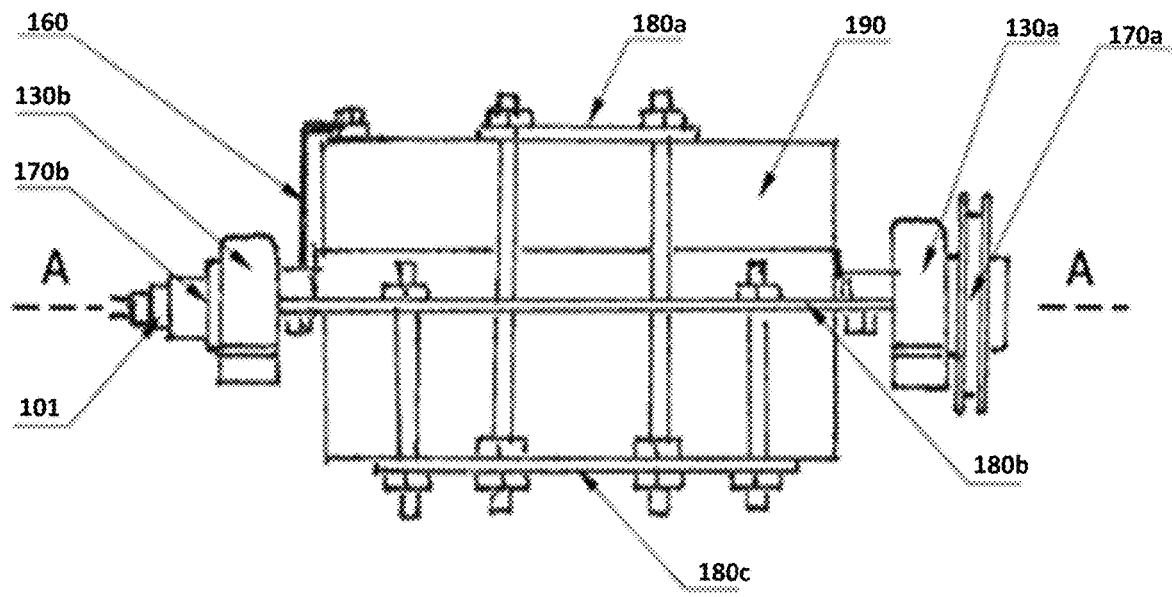
FIG. 3A illustrates the battery container in accordance with certain embodiments of the invention.

FIG. 3A illustrates a cross-section of an example embodiment of the device 100 wherein the device 100 comprises a slip ring connector 101 mounted in one of the semi-axles 170a, 170b through which an electrical connection can be made between the battery 190 and a programmable charging device 112.

Figure 3B:
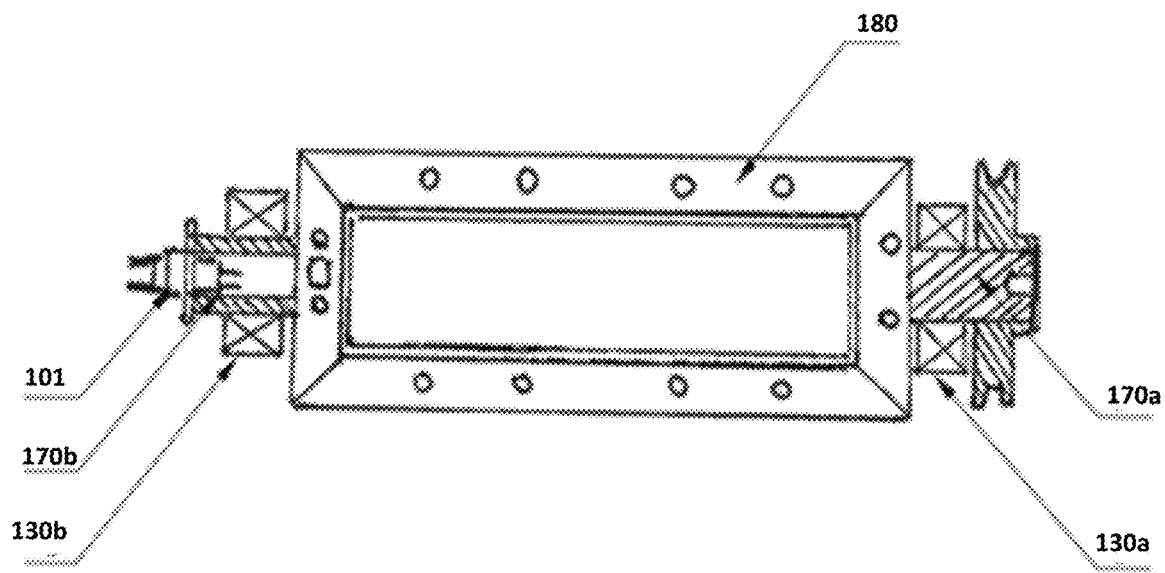
FIG. 3B illustrates a cross-section of the device in accordance with certain embodiments of the invention.

FIG. 3B illustrates a battery container 180 mounted between the two oppositely positioned semi-axles 170 which are mounted on the self-adjusted bearings 130a, 130b with battery 190 inserted therein, as shown along line A-A indicated in FIG. 3A.

Figure 4:
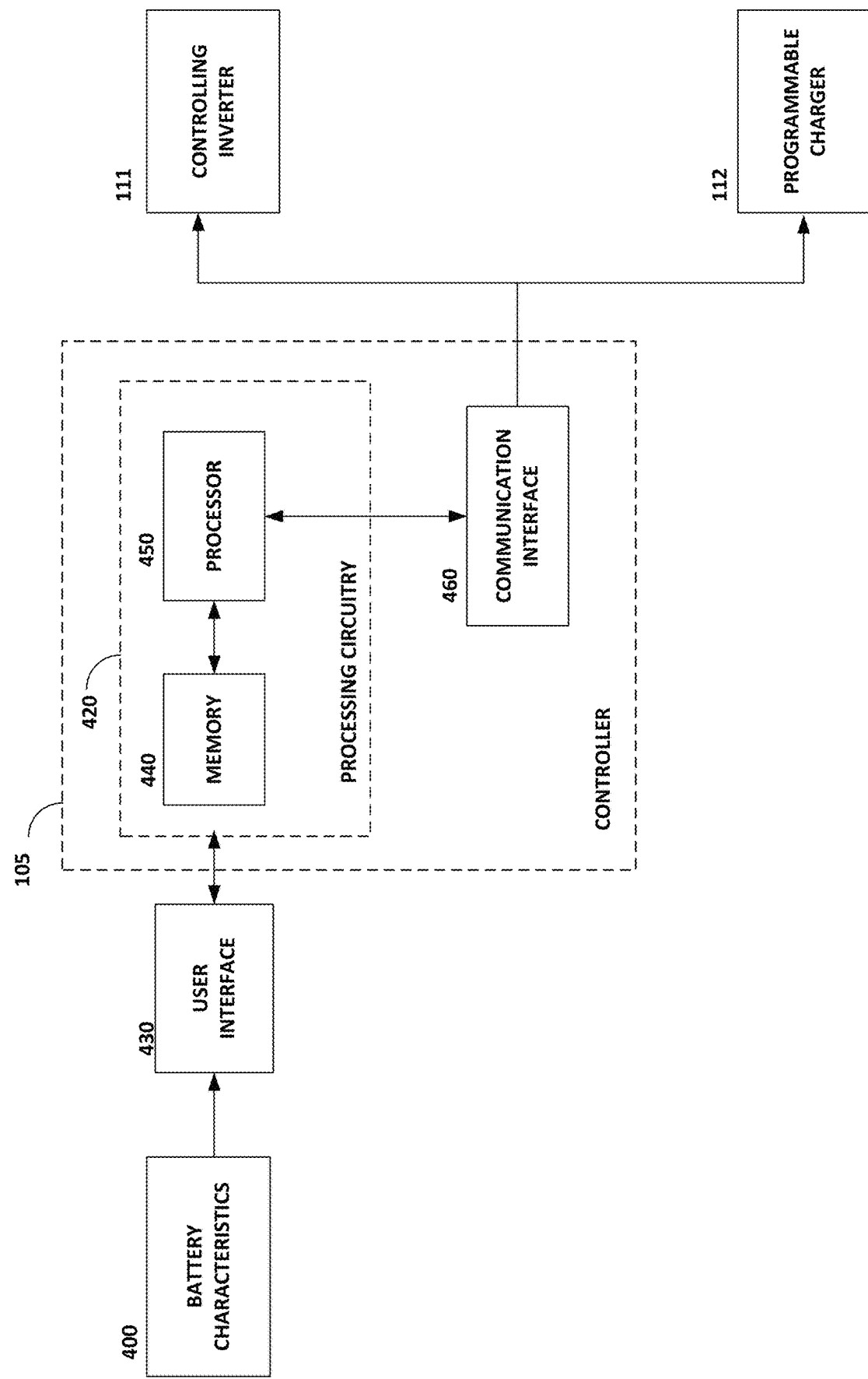
FIG. 4 illustrates a block diagram of a controller in accordance with one or more embodiments of the invention.

Referring now to FIG. 4, a block diagram of a controller 105 is illustrated. In some embodiments, battery features 400 can be input into the controller 105 via a user interface 430. In certain embodiments, for example, the controller 105 may be configured to execute an electrochemical recovery program (not shown) to determine the energy parameters of a battery. In some embodiments, the controller 105 may be a programmable logic controller (PLC). The controller 105 may include or otherwise be in communication with processing circuitry 420 that is configurable to perform actions in accordance with one or more embodiments disclosed herein. In this regard, the processing circuitry 420 may be configured to perform and/or control performance of one or more functionalities of the controller 105 in accordance with various embodiments, and thus may provide means for performing functionalities of the controller 105 in accordance with various embodiments. The processing circuitry 420 may be configured to perform data processing, application execution, and/or other processing and management services according to one or more embodiments. In some embodiments, the controller 105 or a portion(s) or component(s) thereof, such as the processing circuitry 420, may be embodied as or comprise a chip or chip set. In other words, the controller 105 or the processing circuitry 420 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The controller 105 or the processing circuitry 420 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 420 may include a processor 450 and, in some embodiments, such as that illustrated in FIG. 4, may further include memory 440. The processing circuitry 420 may be in communication with or otherwise control a user interface 430 and/or a communication interface 460. As such, the processing circuitry 420 may be embodied as a circuit chip (e.g., an integrated circuit chip) configured (e.g., with hardware, software or a combination of hardware and software) to perform operations described herein.

The processor 450 may be embodied in a number of different ways. For example, the processor 450 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 450 may comprise a plurality of processors. The plurality of processors may be in operative communication with each other and may be collectively configured to perform one or more functionalities of the controller 105 as described herein. In some embodiments, the processor 450 may be configured to execute instructions stored in the memory 440 or otherwise accessible to the processor 450. As such, whether configured by hardware or by a combination of hardware and software, the processor 450 may represent an entity (e.g., physically embodied in circuitry—in the form of processing circuitry 420) capable of performing operations according to embodiments of the present disclosure while configured accordingly. Thus, for example, when the processor 450 is embodied as an ASIC, FPGA or the like, the processor 450 may be specifically configured hardware for conducting the operations described herein. Alternatively, as another example, when the processor 450 is embodied as an executor of software instructions, the instructions may specifically configure the processor 450 to perform one or more operations described herein.

In some embodiments, the memory 440 may include one or more non-transitory memory devices such as, for example, volatile and/or non-volatile memory that may be either fixed or removable. In this regard, the memory 440 may comprise a non-transitory computer-readable storage medium. It will be appreciated that while the memory 440 is illustrated as a single memory, the memory 440 may comprise a plurality of memories. The memory 440 may be configured to store information, data, applications, instructions and/or the like for enabling the controller 105 to carry out various functions in accordance with one or more embodiments. For example, the memory 440 may be configured to buffer input data for processing by the processor 450. Additionally or alternatively, the memory 440 may be configured to store instructions for execution by the processor 450. As yet another alternative, the memory 440 may include one or more databases that may store a variety of files, contents, or data sets. Among the contents of the memory 440, applications may be stored for execution by the processor 450 in order to carry out the functionality associated with each respective application. In some cases, the memory 440 may be in communication with one or more of the processor 450, user interface 430, and/or communication interface 460 via a bus(es) for passing information among components of the controller 105.

The user interface 430 may be in communication with the processing circuitry 420 to receive an indication of a user input at the user interface 430 and/or to provide an audible, visual, mechanical, or other output to the user. As such, the user interface 430 may include, for example, a keyboard, a mouse, a joystick, a display, a touch screen display, a microphone, a speaker, and/or other input/output mechanisms. As such, the user interface 430 may, in some embodiments, provide means for a user to access and interact with the device 100 in accordance with various embodiments.

The communication interface 460 may include one or more interface mechanisms for enabling communication with other devices and/or networks. In some cases, the communication interface 460 may be any means such as a device or circuitry embodied in either hardware, or a combination of hardware and software that is configured to receive and/or transmit data from/to a network and/or any other device or module in communication with the processing circuitry 420. By way of example, the communication interface 460 may be configured to enable the controller 105 to communicate with the controlling inverter 111. Accordingly, the communication interface 460 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet, or other methods.

As a result, the controlling inverter 111 facilitates rotation of a battery so as to restore energy parameters of the battery by homogenizing an electrolyte concentration throughout at least one cell contained within the battery. In particular, homogenizing an electrolyte concentration throughout the at least one cell contained within the battery may comprise mechanically manipulating the electrolyte contained within internal components of the at least one cell until a sulfuric acid concentration is approximately uniform throughout the internal components of the at least one cell.

The controller 105 may optionally be coupled with a non-transitory computer readable medium having computer readable program instructions stored therein. In such embodiments, the non-transitory computer readable medium may comprise instructions which when performed by an apparatus are configured to cause the apparatus to at least perform and calculate electrochemical recovery parameters, and instruct a programmable charging device to deliver energy to the battery based upon the electrochemical recover parameters. In some embodiments, the non-transitory computer readable medium may comprise instructions which when performed by a controller are further configured to cause the controller to regulate energy provided to the controlling inverter 111 to facilitate rotation of a battery 190 so as to restore energy parameters of the battery by homogenizing an electrolyte concentration throughout at least one cell contained within the battery. In such embodiments, homogenizing an electrolyte concentration throughout the at least one cell contained within the battery comprises mechanically manipulating the electrolyte contained within internal components of the at least one cell until a sulfuric acid concentration is approximately uniform throughout the internal components of the at least one cell.

In some embodiments, an electrochemical recovery program executed by the controller 105 may calculate the desired energy parameters based upon the battery's features 400. In some embodiments, for example, the battery's features 400 may be input by a user using a user interface 430.

Method for Restoring Energy Parameters

With reference to FIG. 5, a method for restoring the energy parameters in a battery is provided. The method comprises fixing a battery in a battery container at operation 510, rotating the battery fixed within the battery container at operation 520, and homogenizing an electrolyte concentration within internal components of at least one cell contained within the battery at operation 530. Optionally, the battery may be weight-balanced when the battery is fixed within the battery container, as shown in operation 511. In some embodiments, the method optionally comprises connecting the battery to a bipolar overvoltage pulser (BEAT) device and applying alternating positive and negative pulses to the battery, as shown in operation 512. According to certain embodiments, the method may optionally comprise electrically contacting the battery and a charge device to restore one or more energy parameters of the battery, as shown in operation 521.

The method may be conducted on a battery that is in operation, or a battery that has been inoperably stored. According to some embodiments, the battery may be a lead-acid battery. In some such embodiments, the battery may be a valve-regulated battery. In certain embodiments, the battery may comprise a glass mat separator.

In some embodiments, rotating the battery may comprise rotating the battery around a center axis of rotation. In such embodiments, the battery may optionally comprise a positive electrode on a first end, a negative electrode on a second end and the center axis of rotation may correspond to a center of the battery with respect to the first and seconds ends.

EXAMPLES

Example 1

In this example, the method and device for homogenizing the electrolyte in lead-acid batteries was used on cells during charging. For this purpose, a valve-regulated lead-acid battery having a manufacturer's declared capacity of 180 Ah was selected. The battery was operated in floating charge mode. Before starting the electrolyte homogenization procedure of the selected battery, the values of the internal resistance and the open circuit voltage were measured. These values are shown below in Table 1.

After measuring the internal resistance and open circuit voltage, the battery was placed in the battery container of the device. Next, the battery was balanced and fixed against the axis connecting the centers of the two self-aligning bearings by means of a force meter. Next the controlling inverter was switched on to supply and control the motor reductor. The controlling inverter was used to regulate the rotational speed, which was maintained at 18-20 rpm. The device then performed the electrolyte homogenization procedure by rotating the battery for 1.5 hours.

The internal resistance and open circuit voltage values were then measured. The values obtained are reflected in Table 1.

TABLE 1

A table showing battery features before and after electrolyte homogenization.

| | Internal Resistance | Open Circuit Voltage |
| --- | --- | --- |
| Before Homogenization | $InR_1 = 4.03$ mΩ | $OCV_1 = 12.29$ V |
| After Homogenization | $InR_2 = 3.57$ mΩ | $OCV_2 = 12.31$ V |

The reported results after the completion of the electrolyte homogenization procedure in the lead acid battery illustrate the device's effect on internal resistance and open circuit voltage. Specifically, use of the device caused the batter to exhibit lowered internal resistance with only a minimal change in the open circuit voltage value.

Example 2

In this example, an electrochemical recovery program was applied while performing the homogenization of the electrolyte in the batteries to restore the energy parameters of the working or stored lead-acid batteries. The electrochemical recovery program is a specialized charging program with defined values of current, voltage, and total time for its execution. An electrochemical recovery program was used to determine parameters for the selected battery. The choice of the electrochemical program to recover the energy parameters of the batteries depends on their degree of charge, the type of batteries, and their size, which determines their energy capacity and the regime under which they were put to work.

For this example, a 180 Ah valve regulated battery was used. The values selected for this battery make up an electrochemical recovery program designated "EL1" and involve a charge current of $I_{ch1}=18$ A with a limited charge voltage value of $U_{ch1}=14.4$V for 16 hours.

The 180 Ah valve regulated battery was operated in floating charge mode. The recovery procedure includes the following sequential technological steps:

(1) The internal resistance and open circuit voltage values of the selected battery are measured. The battery is then placed in the homogenization device in the same order and with the same manipulations described in Example 1.

(2) The battery was connected electrically, via a connector (in this example, a slip ring was used) to the programmable charging device.

(3) The controlling inverter is switched on, which powers and controls the motor rotational speed of the batteries being set at 10-12 rpm.

(4) At the same time as the battery is brought into rotational motion, the programmable charging device is switched on in order to execute the electrochemical program to restore the energy parameters of the battery.

Example 3

A 180 Ah valve regulated battery was operated in float charge mode until recovery of the battery was needed. To begin recovery of the energy parameters of the battery, the battery was placed in the electrolyte homogenization device. The battery was then brought into rotational motion at a rotational speed of 10-12 rpm, simultaneously engaging both the programmable charging device to perform the EL1 electrochemical program and the patented bipolar overvoltage battery pulser (BEAT) device manufactured by WaveTech GmbH Germany. The results of this experiment are discussed in Example 4 below.

Example 4

To support results of the methods and device disclosed herein, three nearly identical batteries were operated for the same length of time at the same location and under the same conditions. The discharge capacity of each of three batteries was measured. These values are shown in Table 2. The standard deviation of the discharge capacitance was 0.28 Ah, indicating suitability for comparison. Next, each battery was treated with a recovery method as described below:

The first battery, $B_1$, was treated using only the electrochemical recovery program (EL1).

The second battery, $B_2$, was treated using the device and methods for electrolyte homogenization disclosed herein coupled with the EL1 electrochemical program (as described in Example 2).

The third battery, $B_3$, was treated using the device and methods for electrolyte homogenization disclosed herein coupled with both the EL1 electrochemical program and the BEAT device (as described in Example 3).

Figure 6:
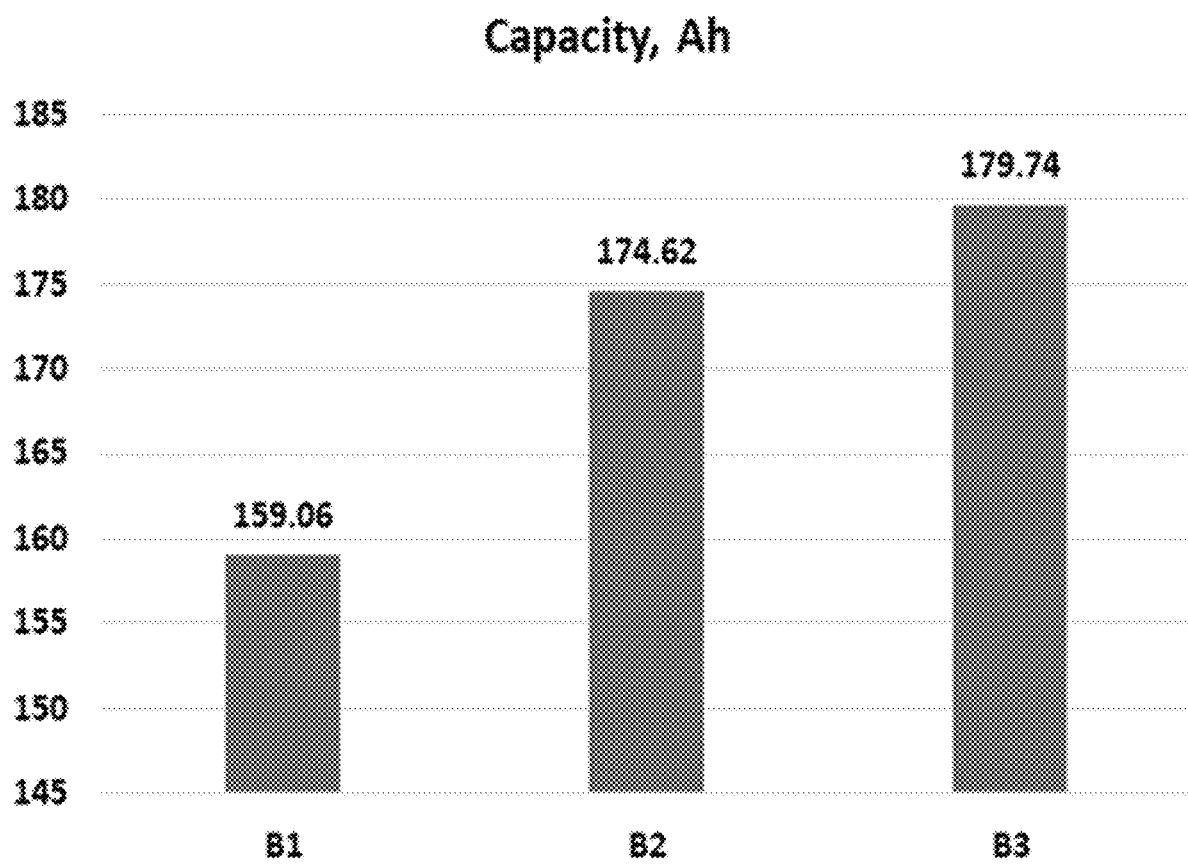
FIG. 6 illustrates discharge capacities of various batteries after recovery.

After the batteries were treated, the discharge capacity of each battery was measured. These values are shown in Table 2 and illustrated in FIG. 6.

TABLE 2

Discharge capacities before and after treatment of batteries.

|  | Discharge Capacity, $B_1$ (Ah) | Discharge Capacity, $B_2$ (Ah) | Discharge Capacity, $B_3$ (Ah) |
| --- | --- | --- | --- |
| Before Homogenization | 125.86 | 126.06 | 126.53 |
| After Homogenization | 159.06 | 174.62 | 179.74 |

After treatment, the value of the discharge capacity of battery $B_2$ was 10.4% higher than that of battery $B_1$. The discharge capacity value of battery $B_3$ saw an even greater improvement than that of Battery $B_2$. Battery $B_3$ had a discharge capacity value that was 13% higher than the discharge capacity value of battery $B_1$.

The results of this trial clearly support that the device and methods disclosed herein significantly increase the efficiency of the procedures used for recovery of the energy parameters of batteries.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for restoring the energy parameters of a battery, the method comprising:
   fixing the battery in a battery container;
   calculating electrochemical recovery parameters for the battery;
   rotating the battery fixed in the battery container;
   homogenizing an electrolyte concentration within internal components of at least one cell contained within the battery; and
   instructing a programmable charging device to deliver energy to the battery based upon the electrochemical recovery parameters.

2. The method of claim 1, further comprising weight-balancing the battery when the battery is fixed in the battery container.

3. The method of claim 1, further comprising electrically contacting the battery and a programmable charging device to restore one or more energy parameters of the battery, wherein restoring the one or more energy parameters occurs simultaneously with rotating the battery fixed in the battery container.

4. The method of claim 1, further comprising connecting the battery to a bipolar overvoltage pulser and applying alternating positive and negative pulses to the battery.

5. The method of claim 1, wherein the battery is in operation.

6. The method of claim 1, wherein the battery is inoperably stored.

7. The method of claim 1, wherein the battery is a lead-acid battery.

8. The method of claim 1, wherein the battery is a valve-regulated battery.

9. The method of claim 1, wherein the battery comprises a glass mat separator.

10. The method of claim 1, wherein rotating the battery comprises rotating the battery around a center axis of rotation.

11. The method of claim 10, wherein the battery comprises a positive electrode on a first end, a negative electrode on a second end, and the center axis of rotation that corresponds to a center of the battery with respect to the first and seconds ends.

12. A device for restoring energy parameters of a battery, the device comprising:
   a supporting frame;
   a programmable charging device
   a controller configured to communicate with the programmable charging device; and
   a battery container configured to receive the battery therein, the battery container being operably coupled to:
      a motor configured to cause rotation of the battery container; and
      a controlling inverter configured to regulate a rotational speed of the motor.

13. The device of claim 12, further comprising a bipolar overvoltage battery pulser, wherein the bipolar overvoltage battery pulser is configured to connect to the battery and apply alternating positive and negative pulses to the battery.

14. The device of claim 12, further comprising:
a bearing axle having a central portion; and
a slip ring mounted on the bearing axle.

15. The device of claim 12, wherein the controller is configured to calculate electrochemical recovery parameters for the battery based on features of the battery.

16. The device of claim 12 wherein the controller operates remotely via a wireless connection.

17. The device of claim 12, wherein the controller is contained within the programmable charging device.

18. The device of claim 12, wherein the battery is a lead acid battery.

19. The device of claim 12, wherein the battery is a valve regulated battery.

20. The device of claim 12, wherein the battery comprises a glass mat separator.

21. A non-transitory computer readable medium having computer readable program instructions stored therein, the non-transitory computer readable medium comprising instructions that when executed by a controller are configured to:
calculate electrochemical recovery parameters for a battery; and
instruct a programmable charging device to deliver energy to the battery based upon the electrochemical recovery parameters.

22. The non-transitory computer readable medium of claim 21, further comprising computer readable program instructions stored therein that, when executed by the controller, are configured to calculate the electrochemical recovery program based upon features of the battery.

23. The non-transitory computer readable medium of claim 21, further comprising computer readable program instructions stored therein that, when executed by the controller are configured to:
regulate energy provided by the controlling inverter to facilitate rotation of a battery so as to restore energy parameters of the battery by homogenizing an electrolyte concentration throughout at least one cell contained within the battery,
wherein homogenizing the electrolyte concentration throughout the at least one cell contained within the battery comprises mechanically manipulating the electrolyte contained within internal components of the at least one cell until a sulfuric acid concentration is approximately uniform throughout the internal components of the at least one cell.

* * * * *